US005701409A

United States Patent [19]
Gates

[11] Patent Number: 5,701,409
[45] Date of Patent: Dec. 23, 1997

[54] ERROR GENERATION CIRCUIT FOR TESTING A DIGITAL BUS

[75] Inventor: Stillman F. Gates, Los Gatos, Calif.

[73] Assignee: Adaptec, Inc., Milpitas, Calif.

[21] Appl. No.: 392,442

[22] Filed: Feb. 22, 1995

[51] Int. Cl.⁶ .................................................. G06F 11/00
[52] U.S. Cl. .......................... 395/183.17; 395/183.19; 395/183.06; 395/185.01
[58] Field of Search .................. 395/183.19, 185.09, 395/183.06, 183.07, 183.17, 182.02

[56] References Cited

U.S. PATENT DOCUMENTS

| | | | |
|---|---|---|---|
| 3,786,415 | 1/1974 | Phillips et al. | 340/146.1 D |
| 4,149,038 | 4/1979 | Pitroda et al. | 179/15 BF |
| 4,999,837 | 3/1991 | Reynolds et al. | 395/182.08 |
| 5,001,712 | 3/1991 | Splett et al. | 395/183.17 |
| 5,033,049 | 7/1991 | Keener et al. | 395/183.09 |
| 5,206,948 | 4/1993 | DeAngelis et al. | 395/183.21 |
| 5,226,153 | 7/1993 | DeAngelis et al. | 395/183.21 |
| 5,257,393 | 10/1993 | Miller | 395/182.02 |
| 5,291,489 | 3/1994 | Morgan et al. | 395/800 |
| 5,297,277 | 3/1994 | Dein et al. | 395/183.21 |

Primary Examiner—Robert W. Beausoliel, Jr.
Assistant Examiner—Joseph E. Palys
Attorney, Agent, or Firm—Skjerven, Morrill, MacPherson, Franklin and Friel; T. Lester Wallace

[57] ABSTRACT

In order to test a parallel digital bus, an integrated circuit adapted for coupling to the bus has a bus error generation circuit which generates and/or simulates bus error conditions on the bus. During test, an error command is loaded into a command register of the bus error generation circuit via the bus. The bus error generation circuit then decodes the command, and either: 1) generates an error condition on the bus during a subsequent bus cycle, or 2) simulates an error condition on the bus during a subsequent bus cycle. A status configuration register in the integrated circuit and status configuration registers in other devices on the bus are then read to determine whether the integrated circuit and other devices properly detected and/or handled the generated or simulated error. By providing a bus error generation circuit in the integrated circuits coupled to a bus inside personal computer, built-in test of the personal computer is facilitated.

4 Claims, 14 Drawing Sheets

Microfiche Appendix Included
(2 Microfiche, 45 Pages)

| PCIERRORGEN register | | |
|---|---|---|
| PCI AD bit | Register bit | bit usage |
| 31 | 7 | PCIERRORGENDIS |
| 30 | 6 | SELPCIHIGHBUS |
| 29 | 5 | spare |
| 28 | 4 | spare |
| 27 | 3 | spare |
| 26 | 2 | test selection |
| 25 | 1 | test selection |
| 24 | 0 | test selection (lsb) |

} Command Register

Commands

| bits (2:0) | | test error selections |
|---|---|---|
| 0 | 000b | IDLE, (default power-on) |
| 1 | 001b | TADRSPARERR |
| 2 | 010b | MTDATAPARERR |
| 3 | 011b | TRDATAPARERR |
| 4 | 100b | MWDATAPARERR |
| 5 | 101b | MADRSPARERR |
| 6 | 110b | DIAGTARGETABORT |
| 7 | 111b | spare |

FIG. 7

ERROR GENERATION CIRCUIT FOR TESTING A DIGITAL BUS

CROSS REFERENCE TO MICROFICHE APPENDICES

Appendix A which is a microfiche appendix of one sheet of microfiche and having a total of 33 frames, contains detailed circuit schematics of part of an integrated circuit having an bus error generation circuit in accordance with a specific embodiment of the present invention. Appendix B which is a microfiche appendix of one sheet of microfiche and having a total of 5 frames, contains detailed circuit schematics in accordance with another specific embodiment of the present invention. A portion of the disclosure of this patent document contains material which is subject to copyright protection. The copyright owner has no objection to the facsimile reproduction by anyone of the patent documents or patent disclosure, as it appears in the Patent and Trademark Office patent files or records, but otherwise reserves all copyright rights whatsoever.

FIELD OF THE INVENTION

This invention relates to the testing of digital buses. More particularly, this invention relates to circuitry for testing a PCI bus.

BACKGROUND INFORMATION

The Peripheral Component Interconnect (hereafter referred to as "PCI") bus is a well-known parallel bus. See "PCI System Architecture" by Tom Shanley and Don Anderson, Mindshare Press, Richardson, Tex. (1993), for general background information on the PCI bus. The subject matter of this document is incorporated herein by reference.

FIG. 1 (Prior Art) is a simplified diagram showing a device 1 including a master 2 which communicates with a target 3 via a PCI bus 4. The PCI bus 4 comprises numerous lines including a clock line PCLK, a frame line FRAME#, time multiplexed address/data lines AD, a parity line PAR, and a data parity error line PERR#. A name followed by a pound symbol (#) indicates that a signal on the line is asserted low.

FIG. 2 (Prior Art) is a waveform diagram of a PCI bus cycle illustrating initiator 2 writing data into target 3. First the initiator 2 indicates the beginning of a bus cycle by forcing the FRAME# line low. The master 2 also places the desired address onto the AD lines. The target 3 uses the rising edge 5 of the clock signal PCLK to latch the address on the AD lines into the target. After determining the parity of the address which was placed on the AD lines, the initiator 2 drives the parity line PAR to the appropriate level. The target 3 uses the next rising edge 6 of the clock signal PCLK to latch the value of the PAR line into the target. The target 3 determines from the address actually received what parity value should have been sent by the master 2 and compares this value with the parity value which was actually received from the master.

Next the master 2 places the data to be written into the target 3 onto the AD lines. The target 3 then uses the next rising edge 7 of the clock signal PCLK to latch the data into the target. The master then drives the parity line PAR with the parity value of the data sent. By latching the parity value sent by the master on the next rising edge 8 and by determining the parity value for the data actually received, the target 3 is able to compare the two parity values as a check for data integrity. If, for example, the parity value determined by the target and received by the target were to disagree, then the target 3 sets the parity error detected bit (bit 15) of a status register 9 of the configuration registers of the target. The target would also drive the parity error response line PERR# low to indicate occurrence of the error to the master. When the master detects the assertion of the parity error response line PERR#, the master logs the error by setting the data parity reported bit (bit 8) of a status register 10 of the configuration registers in the master. The configuration registers are specified by the PCI bus specification.

To test the functioning of PCI bus 4, a special PCI test card 11 is plugged into a spare PCI bus connector slot 12 of device 1. PCI test card 11 can then create an error on the bus. For example, the signal on the parity line PAR can be overridden by the PCI test card so that the value of the parity line PAR as received by the target 3 is incorrect for the data received on the AD lines. Accordingly, the target 3 will detect the parity error, set bit 15 of its status configuration register, and assert the PERR# line low. When the master detects the PERR# line asserted low, the master logs the error by setting bit 8 of the master's status configuration register. Accordingly, the PCI test card 10 is able to generate bus errors on the PCI bus and exercise the error reporting features of the bus to check that the error reporting features of the bus operate as expected.

Testing a device by plugging such a PCI test card into a spare PCI bus slot is, however, generally expensive and requires support and maintenance of the PCI test card. Moreover, a spare PCI bus slot may not be available. Another way of testing the error detecting and reporting capabilities of the PCI bus is therefore sought.

SUMMARY

An integrated circuit is disclosed which has a bus error generation circuit coupled to a bus interface terminal of the integrated circuit. In some embodiments, the integrated circuit is coupled to a PCI bus which is to be tested. To test the PCI bus, a device on the PCI bus loads an error command into a command register of the bus error generation circuit of the integrated circuit via the PCI bus. The bus error generation circuit decodes the error command, waits until a subsequent PCI bus cycle, and during the subsequent PCI bus cycle generates a corresponding error condition onto the PCI bus via the PCI bus terminal.

In some embodiments, the PCI bus terminal of a master device is a parity terminal PAR coupled to the PAR line of the PCI bus. After a particular error command is loaded into the command register of the bus error generation circuit of the master device, the bus error generation circuit causes an incorrect parity value to be output onto the PCI bus terminal PAR during a subsequent data write PCI bus cycle. A target device on the PCI bus receives the data and the incorrect parity, logs the error condition by setting a bit in its status configuration register, and asserts the parity error signal on the PERR# line back to the initiator device. Upon receiving the parity error signal on the PERR# line, the master device sets an appropriate bit in its status configuration register. The command register of the bus error generation circuit is cleared so that the error condition will be generated only once. In this way, the device on the PCI bus which loaded the master device with the error command can read the status configuration registers of the master and target devices over the PCI bus to make sure that the incorrect parity value on the PCI bus was properly detected and handled on the PCI bus.

In some embodiments, an integrated circuit has a bus error generation circuit which simulates a bus error condition on the PCI bus. A bus error generation circuit of a target device integrated circuit may, for example, invert the parity value received on the parity line PAR of a PCI bus coupled to the integrated circuit. The inverted parity value is then supplied to a parity error check circuit of the target device integrated circuit. Because the parity error check circuit determines the correct parity for the data actually received on the PCI data lines, the mismatch between the determined parity value and the inverted parity value received from the bus error generation circuit is logged by setting a bit in the status configuration register of the target device. The target device also asserts the parity error signal on the PERR# line back to the master device. Upon receiving the parity error signal on the PERR# line, the master device sets an appropriate bit in its status configuration register. A device on the PCI bus which loaded the bus error generation circuit of the target with the error command can then read the status configuration registers of the target and master devices to make sure that the simulated parity error was correctly detected and handled. Accordingly, the error detecting and handling capabilities of a master device can be tested even if the master does not have the ability to generate a test error condition onto the PCI bus.

Circuitry for generating and simulating numerous bus error conditions other than PCI bus data write parity error conditions are also disclosed. Methods and structures for determining that a parity generator correctly determines the PCI bus PAR value for all possible input values to the parity generator is also disclosed.

A bus error generation circuit in accordance with the present invention can be relatively inexpensively placed in the multiple integrated circuits coupled to a parallel bus (such as a PCI bus) inside a computer (such as a personal computer) to facilitate built-in test of the computer.

BRIEF DESCRIPTION OF THE DRAWINGS

FIG. 7 illustrates the bits of a PCIERRORGEN register as well as various commands that can be loaded into the register.

DETAILED DESCRIPTION OF THE PREFERRED EMBODIMENTS

Figure 1:
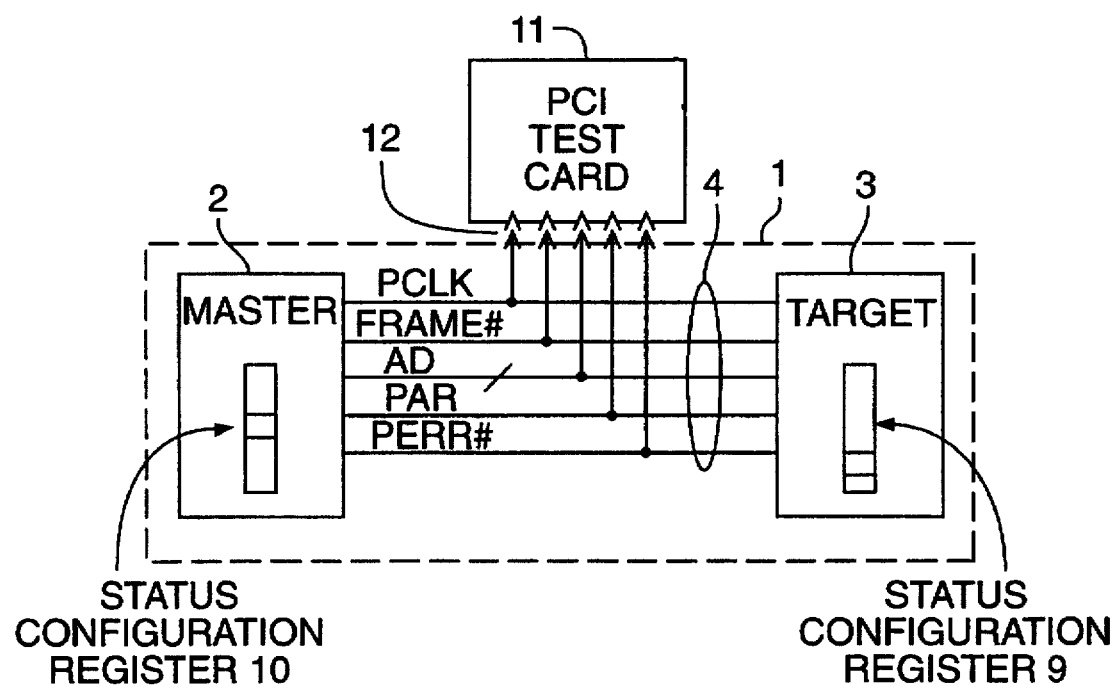
FIG. 1 (Prior Art) is a simplified diagram showing a master which communicates with a target via a PCI bus.
Figure 2:
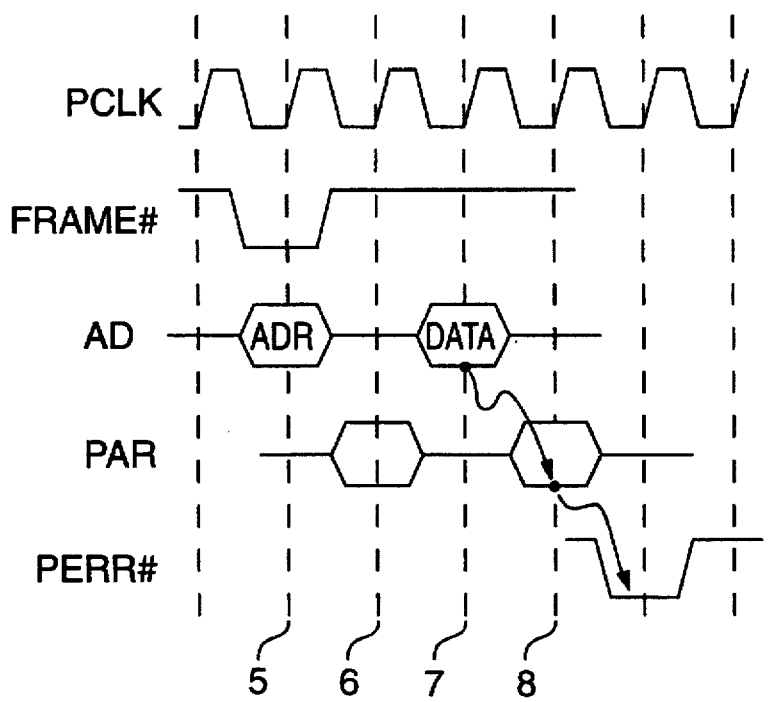
FIG. 2 (Prior Art) is a simplified waveform diagram of a PCI bus cycle illustrating an operation of FIG. 1.
Figure 3:
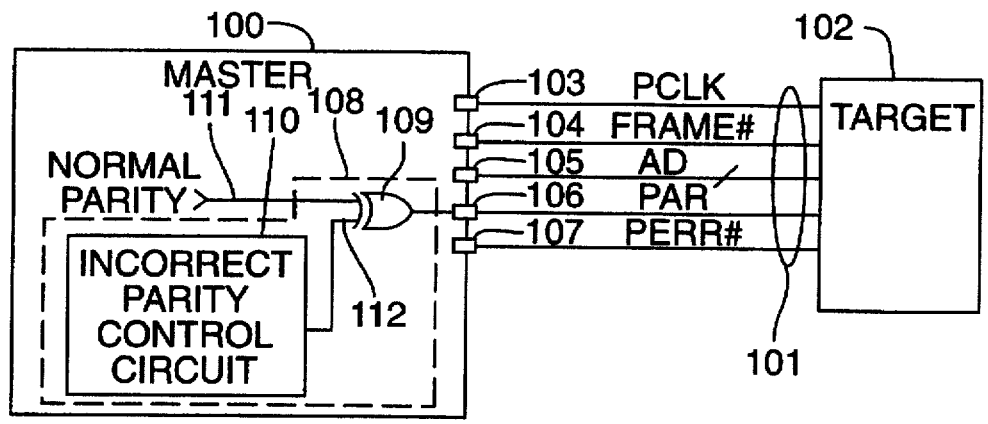
FIG. 3 is a simplified block diagram of an integrated circuit in accordance with an embodiment.

FIG. 3 is a simplified block diagram of an integrated circuit 100 coupled by a PCI bus 101 to a target device 102.

Integrated circuit 100 includes a plurality of bus interface terminals 103–107 and a bus error generation circuit 108. In one embodiment, bus error generation circuit includes an exclusive OR gate 109 and an incorrect parity control circuit 110. It is understood that integrated circuit 100 may have numerous other terminals and numerous other blocks of circuitry and that PCI bus 101 includes numerous other lines. Such additional terminals, circuitry and lines are omitted from the diagram to simplify the illustration and to clarify the following explanation.

Figure 4:
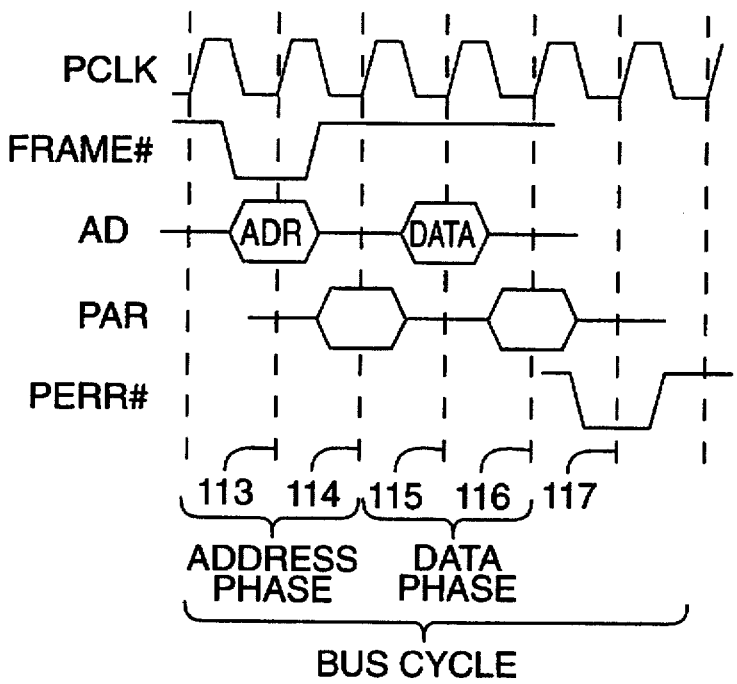
FIG. 4 is a simplified waveform diagram illustrating an operation of the integrated circuit of FIG. 3.

FIG. 4 is a waveform diagram illustrating testing of PCI bus 101 using integrated circuit 100 of FIG. 3. When integrated circuit 100 is functioning as a master, PCI interface circuitry (not shown) inside integrated circuit 100 first outputs an address onto AD bus terminals 105. The PCI interface circuitry then determines the correct parity value for the address and supplies this parity value onto normal parity lead 111. Because the incorrect parity control circuit 110 outputs a low value to indicate that normal parity will be output onto PAR bus terminal 106 during this address phase of the bus cycle, one input lead 112 of exclusive OR gate 109 is driven with a digital low. As a result, if the parity value on normal parity lead 111 is a digital high, then the exclusive OR gate 109 will output a digital high and PAR bus terminal 109 is driven with a digital high. If, on the other hand, the parity value on normal parity lead 111 is a digital low, then the exclusive OR gate 109 will output a digital low and PAR bus terminal 109 is driven with a digital low. The address is shown present on the AD lines at time 113 and the corresponding parity is shown present on the parity bus line PAR at time 114.

Next, for a write bus cycle, the PCI interface circuitry of integrated circuit 100 outputs data onto AD bus terminals 105. In FIG. 4, data is shown present on the AD lines of the PCI bus at time 115. The PCI interface circuitry also determines the correct parity value for the data and supplies this parity value onto normal parity lead 111. Rather than controlling gate 109 to output the correct parity on lead 111, however, incorrect parity control circuit 110 controls gate 109 to output the incorrect parity value onto parity bus terminal 106 in order to simulate an error on the PCI bus 101.

Incorrect parity control circuit 110 therefore outputs a digital high onto input lead 112 of exclusive OR gate 109. As a result, the digital value opposite to the digital value on normal parity lead 111 is output by gate 109 onto PAR bus terminal 106. If, for example, the correct parity value is a digital high, then a digital low is output onto parity PAR bus terminal 106. If, on the other hand, the correct parity value is a digital low, then a digital high is output onto PAR bus terminal 106. The incorrect parity value is therefore present on PAR bus terminal 106 at time 116.

Parity checking circuitry inside target 102 determines a parity value for the data actually received on the AD lines of the PCI bus 101 at time 115 and compares this parity value to the incorrect parity value received on parity line PAR of the PCI bus at time 116. Because the two parity values are different, the parity checking circuitry sets a bit (bit 15) in its status configuration register and forces the parity error PERR# line of the PCI bus 101 low thereby indicating that the parity checking circuitry in the target recognized a disagreement between the data and the associated parity value on the PCI bus.

The master of the transaction sets a bit (bit 8) of a PCI status configuration register in integrated circuit 100 when the PERR# signal is detected as being asserted on the rising edge of the clock signal PCLK at time 117. Other devices such as a system processor which controls the execution of tasks by devices on the PCI bus can then read the status configuration registers (not shown) of integrated circuit 100 and target device 102 to determine more information relating to the error on the PCI bus.

In some embodiments, a system processor can test the error detecting and reporting features of devices on PCI bus 101 by writing a command into a command register (not shown) in incorrect parity control circuit 110. Writing of this command causes the incorrect parity control circuit 110 to generate an error on the PCI bus 101, which causes target 102 set a bit (bit 15) in its status configuration register and to report the error by asserting the PERR# line low. When integrated circuit 100 detects the PERR# line asserted low, a bit (bit 8) in the status configuration register of integrated circuit 100 is set. The system processor can therefore read the status configuration registers of the master integrated circuit and the target device to make sure that error detecting and reporting features worked correctly.

Figure 5:
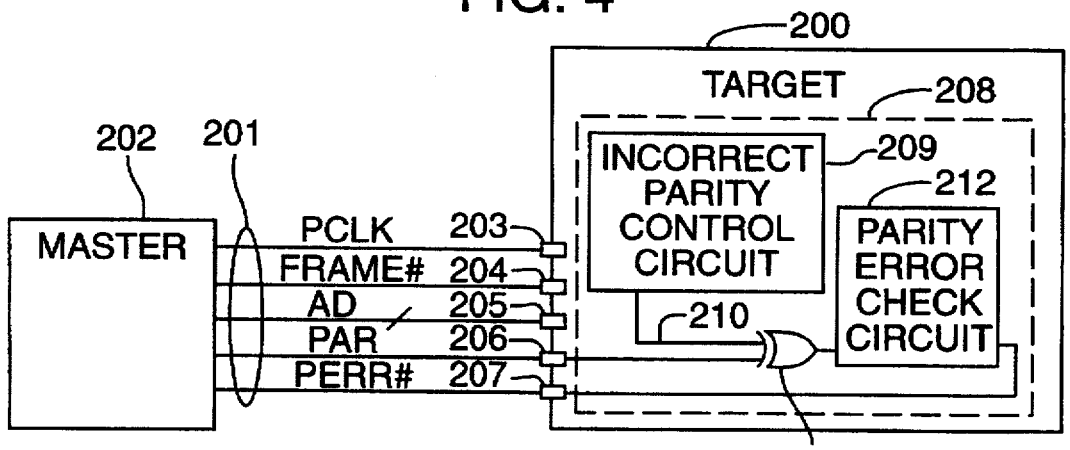
FIG. 5 is a simplified block diagram of an integrated circuit in accordance with another embodiment.

FIG. 5 is a simplified block diagram of an integrated circuit 200 coupled by a PCI bus 201 to a master device 202 in accordance with another embodiment. Integrated circuit 200 includes a plurality of bus interface terminals 203–207 and a bus error generation circuit 208.

In the event that master device 202 does not have the capacity to generate a bus error condition in a test mode, a bus error condition is simulated by integrated circuit 200 so that the PCI error detecting and reporting features can be tested. If, for example, a parity error is to be simulated in the data phase of a PCI bus write cycle, then master device 202 places the address onto PCI lines AD (see FIG. 4) before time 113, places the correct parity value onto PCI line PAR before time 114. Because a parity error is not in this case to be simulated during the address phase of the bus cycle, an incorrect parity control circuit 209 of the bus error generation circuit 208 outputs a digital low onto one input lead 210 of an exclusive OR gate 211. As a result, the correct parity value is passed through gate 211. A parity error check circuit 212 of the bus error generation circuit 208 determines the parity value for the data received on AD bus terminals 205 and compares this parity value with the parity value output by gate 211. Because the two parity values are the same, the parity error check circuit 212 detects no parity error and the parity error line PERR# of the PCI bus is not asserted.

Next, master device 202 places the data of the bus cycle onto the AD lines of the PCI bus before (see FIG. 4) time 115 and places the correct parity value onto the line PAR of the PCI bus before time 116. To simulate a parity error during this data phase, incorrect parity control circuit 209 of the target outputs a digital high onto input lead 210 of gate 211. Accordingly, gate 211 outputs the opposite of the parity value received on PAR bus terminal 206 to the parity error check circuit 212. When the parity error check circuit 212 determines the correct parity value for the data received on AD bus terminals 205 and compares this determined parity value with the parity value passed to it by gate 211, a parity error is detected. As a result, the parity error check circuit 212 sets a bit (bit 15) in a target status configuration register and causes a low signal to be asserted onto PERR# bus terminal 207 and the associated PERR# line of the PCI bus before time 117.

After detecting the assertion of the PERR# signal on the PERR# line of the PCI bus, a bit (bit 8) in a status configuration register (not shown) in master device 202 may be set. In some embodiments, a system processor can test the error detecting and reporting features of devices on PCI bus 201 by writing a command into a command register (not shown) in incorrect parity control circuit 209. A subsequent write by the master therefore causes the target to simulate a bus error on the bus and to report the simulated error. The system processor can then read the status configuration registers to determine whether the error detecting and reporting features of the devices on PCI bus 201 functioned properly.

Figure 6:
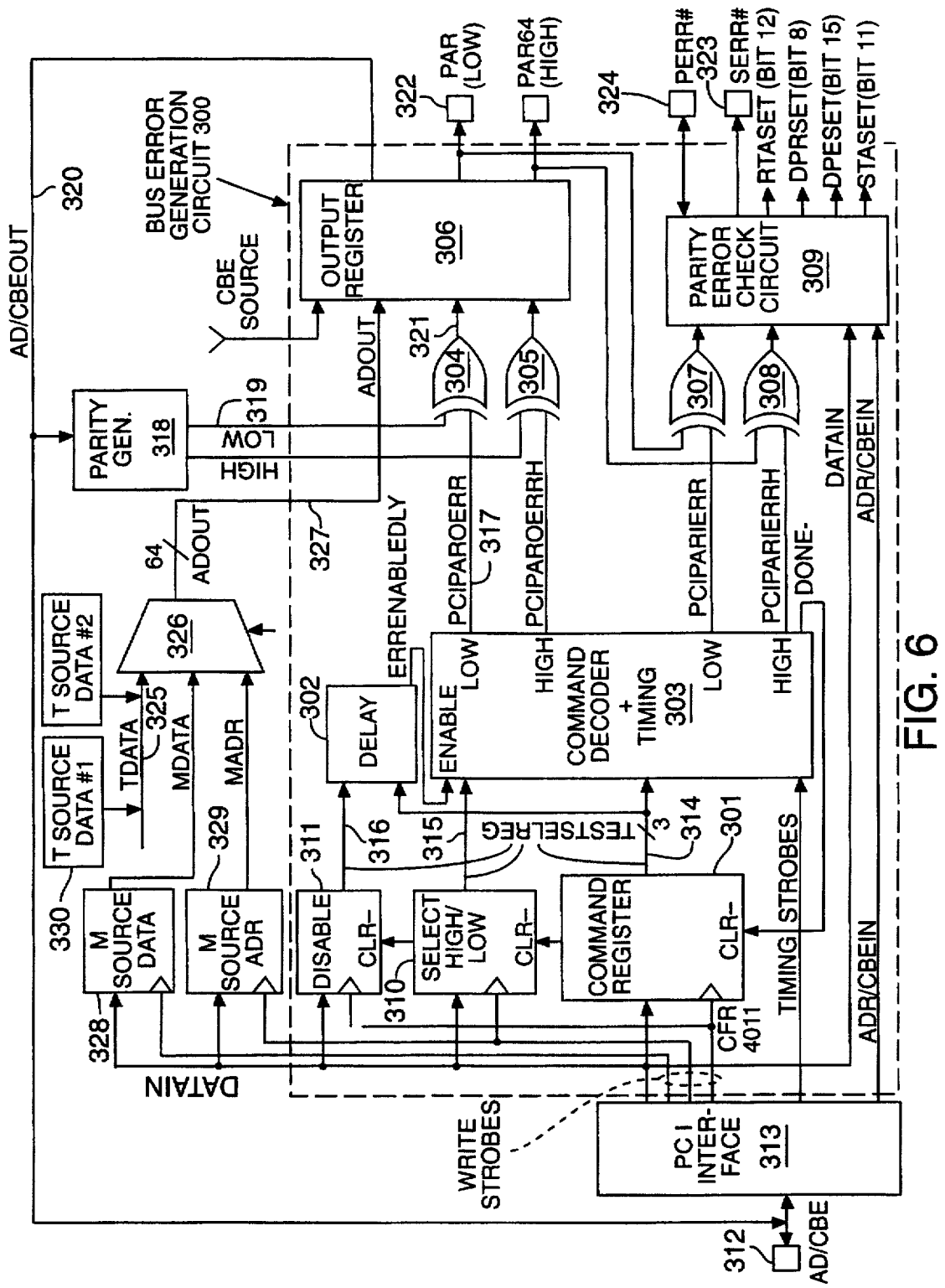
FIG. 6 is a simplified block diagram showing a bus error generation circuit having a command register and command error execution circuitry in accordance with another embodiment.

FIG. 6 is a simplified block diagram showing a bus error generation circuit 300 having a command register 301 and command error execution circuitry 302–309. In some embodiments, exclusive OR gate 109 of FIG. 3 corresponds with exclusive OR gate 304 of FIG. 6 and exclusive OR gate 211 of FIG. 5 corresponds with exclusive OR gate 307 of FIG. 6. Command register 301 as well as a select high/low bit 310 and a disable bit 311 make up bits of a PCI error generation register (PCIERRORGEN). The PCIERRORGEN register can be accessed (read or written) at address 40h in the PCI configuration space.

FIG. 7 illustrates the bits of the PCIERRORGEN register. Bit 7 is the disable (PCIERRORGENDIS) bit 311. Bit 6 is the select high/low (SELPCIHIGHBUS) bit 310. Bits 2, 1 and 0 make up the command register 301. Bits 5, 4 and 3 are spare in some embodiments but are available for future error command definition. FIG. 7 also illustrates the various commands that can be loaded into the command register in the specific embodiment.

Figure 8A:
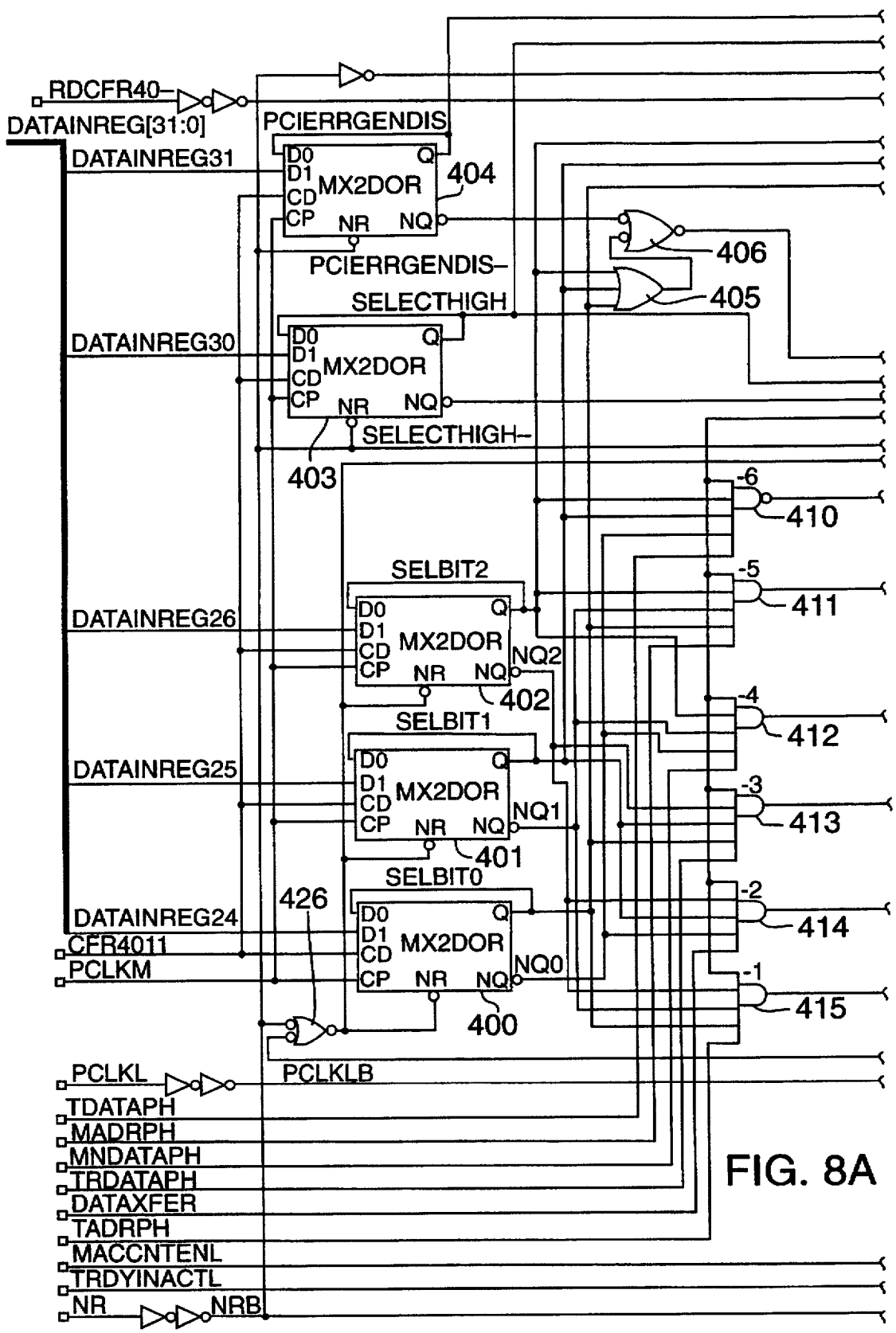
FIGS. 8A–8B is a circuit schematic of a specific embodiment which corresponds with the block diagram of FIG. 6.
Figure 8B:
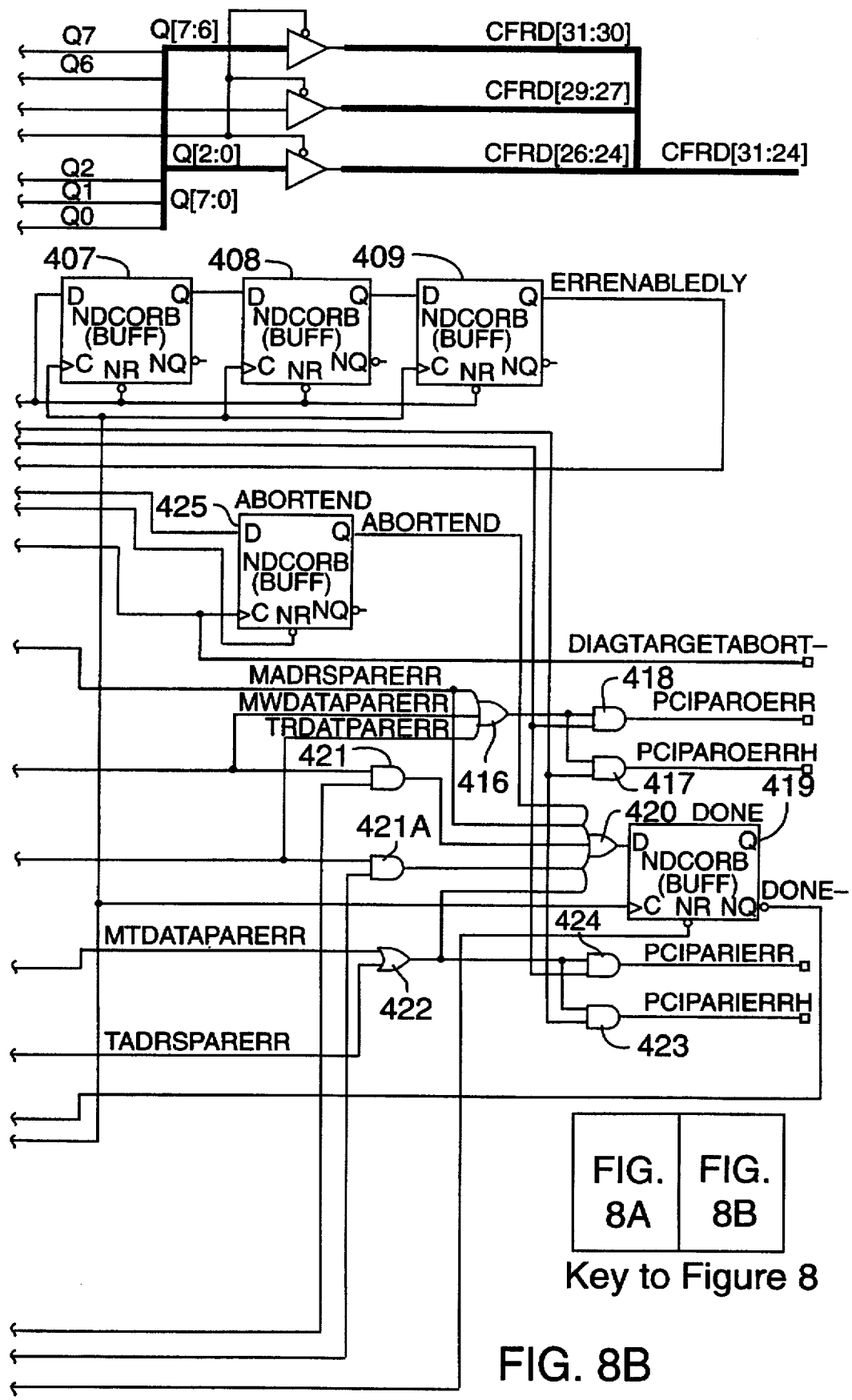

FIGS. 8A–8B is a circuit schematic of a specific embodiment which corresponds with the block diagram of FIG. 6.

FIGS. 9A–9H are timing diagrams which illustrate how the circuitry of FIG. 6 and FIGS. 8A–8B execute each of the commands shown in FIG. 7. The waveform signal names appearing in FIGS. 9A–9H correspond with identical signal names appearing in FIG. 6 and FIGS. 8A–8B.

Figure 9A:
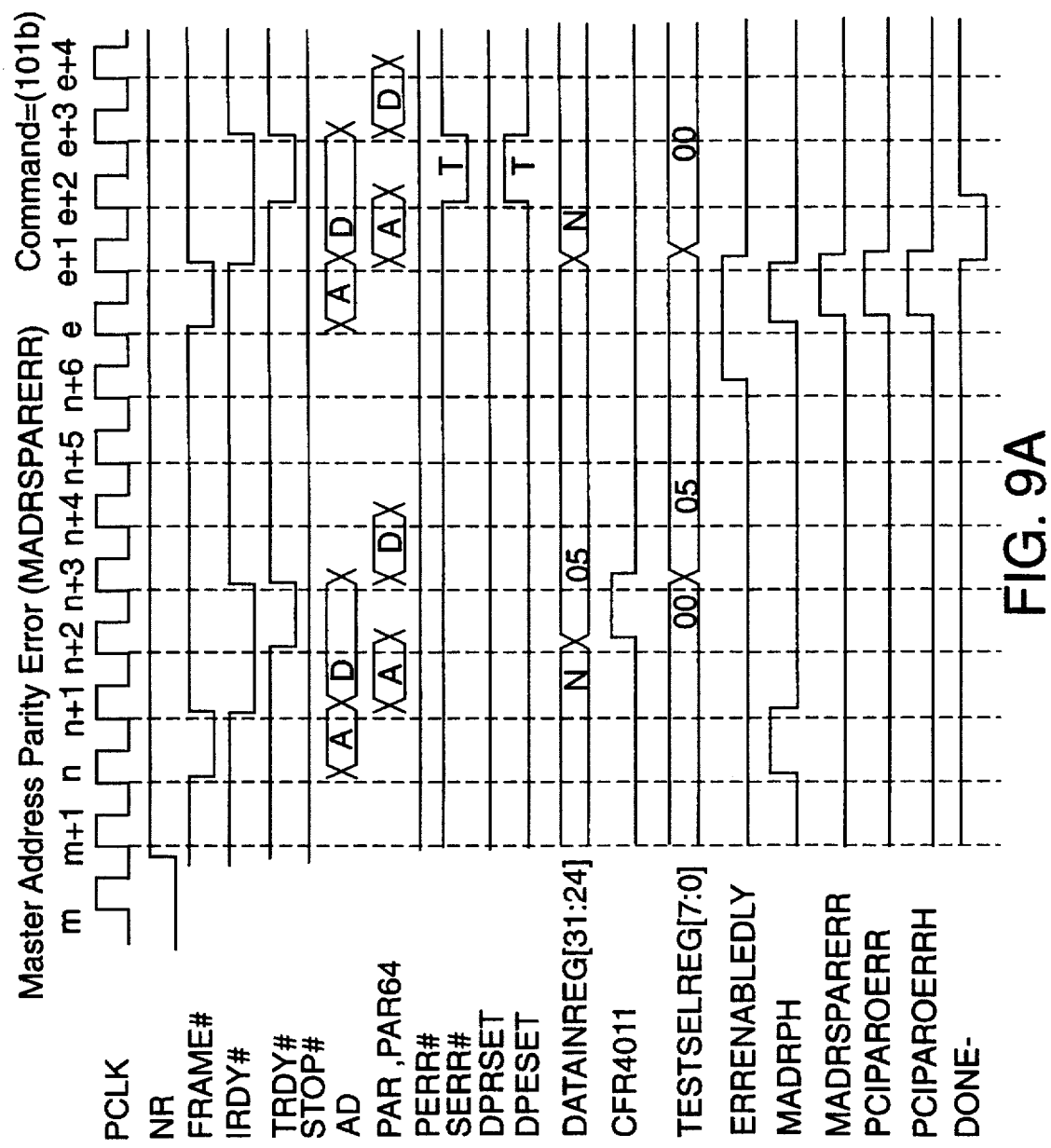
FIGS. 9A–9H are timing diagrams which illustrate how the circuitry of FIG. 6 and FIGS. 8A–8B execute each of the commands.

FIG. 9A illustrates execution of a command which causes the "Master Address Parity Error" (MADRSPARERR). A parity error is generated on PCI bus line PAR or PCI bus line PAR64 during the device's next (read or write) master address phase. (The "device" here is the integrated circuit which includes the bus error generation circuit 300.) Loading a one into select high/low bit 310 causes the parity error to be output onto the PCI parity line for the upper doubleword associated with AD[63:32] and BE#[7:4]. Loading a zero into select high/low bit 310, on the other hand, causes the parity error to be output onto the PCI parity line for the lower doubleword associated with AD[31:0] and BE[3:0].

In FIG. 9A, the signals PCLK, FRAME#, IRDY#, TRDY#, STOP#, AD, PAR, PAR64, PERR# and SERR# are PCI bus signals in accordance with the PCI bus specification. Revision 2.0 of the PCI bus specification can be obtained from the PCI Special Interest Group, M/S HF3-15A, 5200 N.E. Elam Young Parkway, Hillsboro, Oreg. 97124. The # symbol indicates the signal is asserted low. There AD represents the thirty-two bit address/data signals. The signal NR is a reset signal internal to the integrated circuit containing the bus error generation circuit 300, the signal NR being derived from the PCI reset signal RST#.

A PCI write command is performed to address 40h so that the command (101b) is written into the command register 301 via PCI bus terminals AD/CBE (address/data and command/byte enable) 312 and via PCI interface circuitry 313. Signal CFR4011 is an address decode signal which is high during a PCI write access to address 40h byte 3 (the address of the PCIERRORGEN register). Accordingly, the data value on the PCI AD lines [26:24, 30 and 31] are stored in the command register 301, the select high/low bit 310 and the disable bit 311 on the rising edge n+3 of the PCI clock PCLK when CFR4011 is high. FIG. 9A therefore shows the value on the output lines 314–316 (TESTSELREG[7:0]) of the PCIERRORGEN register going from 00h to 05h after the rising edge of PCLK n+3.

Decoding circuitry of the command decoder and timing circuitry 303 (see FIG. 6) therefore decodes the digital value 101b output from the command register 301 to supply a digital one on line PCIPAROERR 317 to exclusive OR gate 304 to invert the parity value for the value on the AD lines of the PCI bus. If for example, the parity generator 318 generated a correct parity value on line 319 for the value on the AD lines 320 of the integrated circuit, then exclusive OR gate 304 would output the opposite parity value on line 321 to output register 306 thereby causing an incorrect parity value to be output to parity PCI bus terminal PAR 322.

The parity error is not, however, to be generated for the present write cycle into the command register but rather is to be generated during the device's next (read or write) master address phase. Delay circuit 302 (see FIG. 6) therefore detects a non-zero value being present in command register 301 and prevents PCIPAROERR line 317 from being asserted high until enough time has past that the present bus cycle has been completed.

In the specific embodiment of FIGS. 8A–8B, flip-flops 400–402 are a command register, flip-flop 403 is a select high/low bit, and flip-flop 404 is a disable bit. When each of the bits of the command register outputs a digital low, OR gate 405 and AND gate 406 also output a digital low to continuously clear the flip-flops 407–409 of a delay circuit. The output of the delay circuit, signal ERRENABLEDLY, is therefore held low thereby keeping decoding gates 410–415 disabled. When the non-zero command (101b) is loaded into the command register flip-flops 400–402, OR gate 405 and AND gate 406 output a digital one thereby releasing the clear signal from flip-flops 407–409 if disable bit 404 is not set. Three rising edges of PCLK later (after the present bus cycle is over), a digital one has propagated through flip-flops 407–409, the signal ERRENABLEDLY goes high, and decoding gates 410–415 are enabled. In FIG. 9A, the signal ERRENABLEDLY is shown going high shortly after the rising edge n+6 of PCLK.

The next bus cycle (the master address phase of which the parity error is to be generated) starts at the rising edge e of PCLK. The PCI interface circuitry 313 (see FIG. 6) generates a signal MADRPH ("master address phase" which is one of the timing strobes) which is asserted high when the device is a master performing an access (read or write) to a target in the address phase. As shown in the specific embodiment of FIGS. 8A–8B, this signal is supplied to one input of AND gate 411 to strobe the signal MADRSPARERR ("master address parity error") output from the AND gate high. Signal MADRSPARERR being strobed high causes the output of OR gate 416 to strobe high. Because the low doubleword has been selected by loading select high/low bit 310 with a digital zero, the lower input of AND gate 417 is a digital zero thereby holding signal PCIPAROERRH low. The lower input of AND gate 418 is, however, supplied with a digital one. As a result, the signal PCIPAROERR strobes high as shown in FIG. 9A after PCLK rising edge e. As explained above, exclusive OR gate 304 causes the parity value on line 319 (see FIG. 6) to be inverted so that the parity value output onto the PCI bus through output register 306 will be the opposite of the correct value (if parity generator 318 is functioning properly).

After the bus error condition has been created on the PCI bus for one bus cycle, the bus error generation circuit 300 removes the bus error condition. When signal MADRSPARERR strobes high (see FIGS. 8A–8B), a digital one is supplied onto the D input of D flip-flop 419 via OR gate 420. As shown in FIG. 9A, a digital one is therefore loaded into flip-flop 419 on the next rising edge e+1 of PCLK. The signal DONE- (the - indicates the signal is asserted low) therefore is asserted low as illustrated in FIG. 9A. As shown in FIGS. 8A–8B and 6, the signal DONE- is used to clear the command register 301. Clearing the bits of the command register causes OR gate 405 and AND gate 406 to clear the delay circuit flip-flops 407–409. The bus error generation circuit 300 is therefore ready to be loaded with another command.

Although FIG. 9A shows the signal PCIPAROERRH going high at the same time as signal PCIPAROERR, it is understood that only one of the two signals will go high as determined by the contents of the select high/low bit 310. Similarly, only one of the parity error signals PAR or PAR64 will be asserted at a time as determined by the contents of the select high/low bit 310 while the other PAR or RAR64 will be a correct value (assuming no logic defects in its circuitry).

When the signal PAR has the incorrect digital value for the address being output onto the PCI bus by the master, the target on the PCI bus detects the error condition, sets bit 15 of its status configuration register, and asserts PCI bus line SERR# low. (The waveform labeled DPESET in FIG. 9A represents a signal internal to the target which results in the status configuration register of the setting of bit 15 in the target.) The signal SERR# of the PCI bus being asserted low in FIG. 9A is due to the target and not due to the master.

Figure 9B:
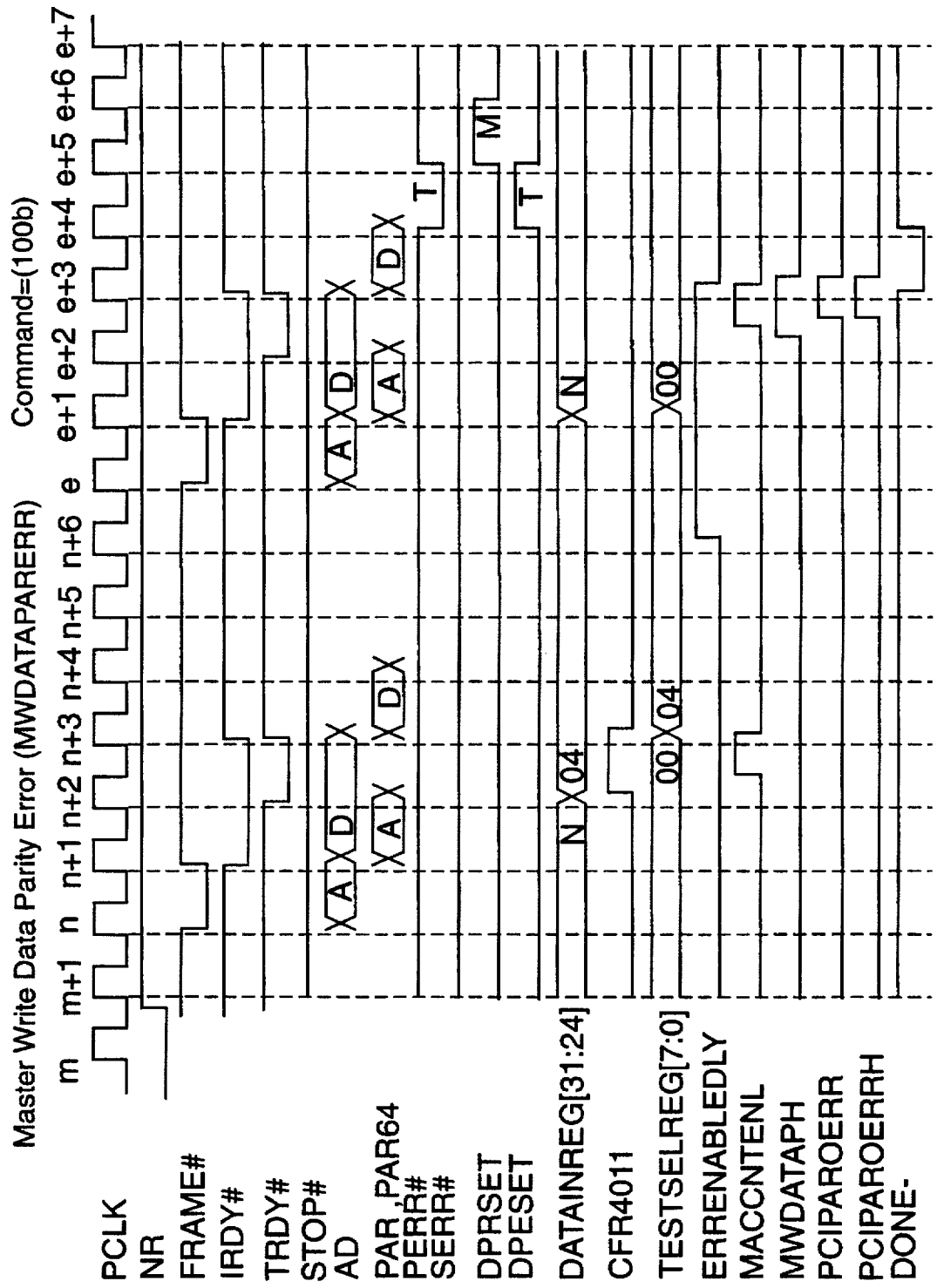

FIG. 9B illustrates execution of a command which causes the "Master Write Data Parity Error" (MWDATAPARERR). A parity error is generated on PCI bus line PAR or PCI bus line PAR64 during the device's next master write data phase. In a first bus cycle, a PCI write command is performed to address 40h so that the command (100b) is written into the command register 301. As in the case of the command generating the MADRSPARERR error described above, the delay circuit 302 detects the non-zero value in the command register and only enables the decode gates 410–415 after the first bus cycle that loaded the command register is completed. The PCI interface circuitry 313 asserts the strobe signal MWDATAPH high (the signal "master write data phase" is one of the strobe signals) when the device is a master transferring data in a write cycle to a target.

When signal MWDATAPH is asserted high, AND gate 412 of the command decoder and timing circuit 303 outputs a digital high through OR gate 416 to AND gates 417 and 418. If the select high/low bit contains a digital zero, then AND gate 417 is prevented from outputting a digital high. AND gate 418, on the other hand, asserts signal PCIPAROERR as indicated in FIG. 9B after the rising edge e+2. Exclusive OR gate 304 (see FIG. 6) therefore inverts the parity value output by parity generator 318 for the data being output by the master and supplies the inverted parity value through output register 306 to parity error PCI bus terminal PAR 322.

As in the case of the command which generated the MADSPARERR error described above, the command register is to be cleared after execution of the bus cycle having the error condition. Rather than supplying the signal MWDATAPARERR directly to OR gate 420 as was done with the signal MADRSPARERR, the signal MWDATAPARERR is qualified by a signal MACCNTENL (signal "master address/count (increment) count enable latched" is one of the strobe signals) so that the error will only be generated when the target is ready to accept the data. The PCI interface circuitry 313 asserts the signal MACCNTENL high when the device is a master and current data is valid for transfer on the next clock (i.e. IRDY and TRDY are active). This next clock is the same clock that PAR is to be output onto the PCI bus for the current data.

When MACCNTENL strobes high, AND gate 421 outputs a digital high. A digital high is therefore present on the D input of flip-flop 419 through OR gate 420 and flip-flop 419 is set on the next rising edge e+3 of PCLK as shown in FIG. 9B. Setting flip-flop 419 clears the command register and delay circuit as described above in connection with the command which generated the MADRSPARERR error.

When the target receives the inverted parity value on the PCI PAR bus line and the contradicting data on the PCI AD lines, the target sets bit 15 of its status configuration register and asserts the PCI bus line PERR# low as indicated in FIG. 9B. (The waveform labeled DPESET in FIG. 9B represents a signal internal to the target which results in the setting of bit 15 of the target's status configuration register.) When the parity error check circuit 309 of the master detects the signal on PERR# PCI bus terminal 324 asserted low, the parity error check circuit 309 asserts the signal DPRSET to log the error condition in bit 8 of the status configuration register of the master. (The waveform labeled DPRSET in FIG. 9B represents in FIG. 9B represents a signal internal to the master which results in setting bit 8 of the master's status configuration register.)

Figure 9C:
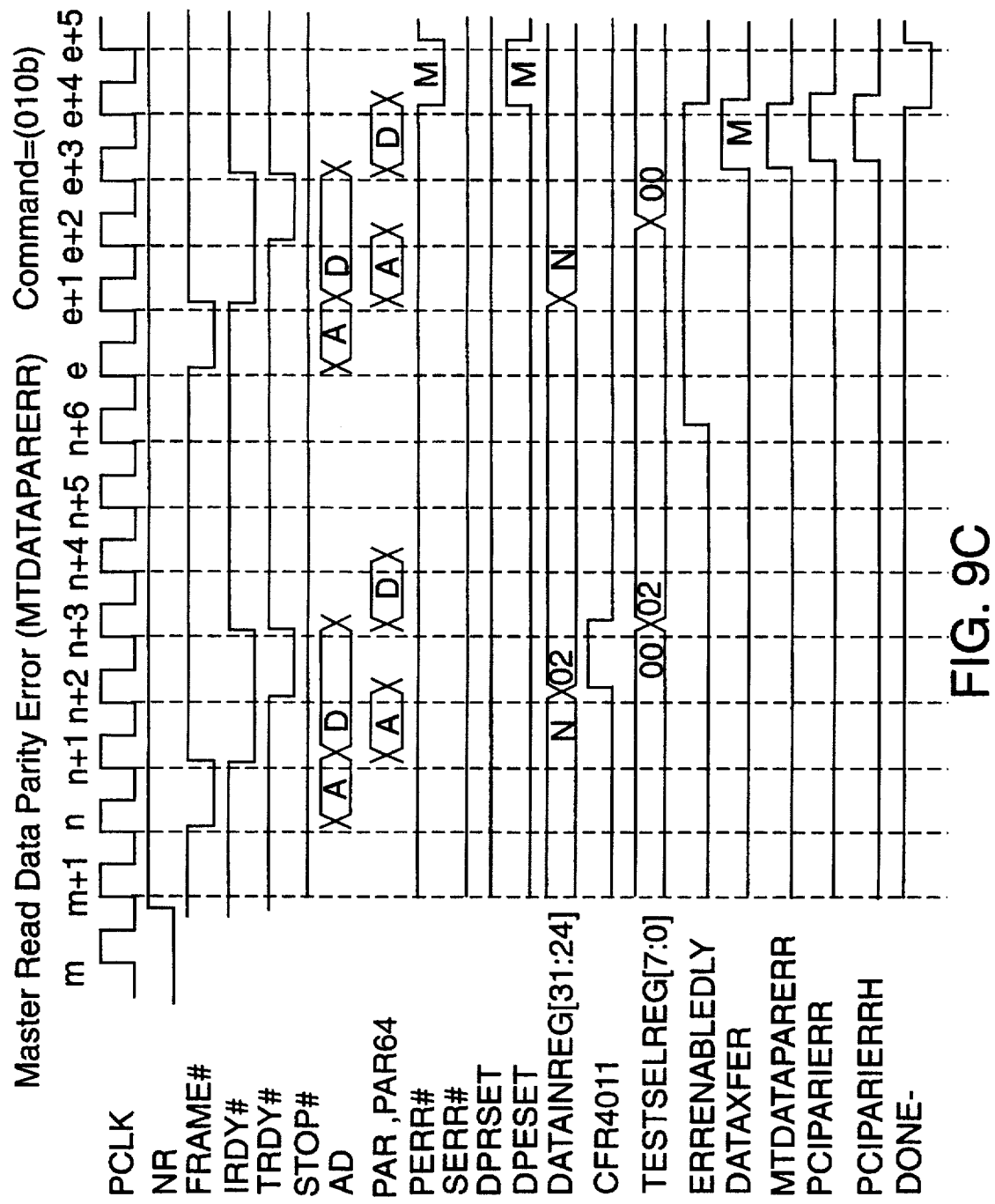

FIG. 9C illustrates execution of a command which simulates the "master read data parity error" (MTDATAPARERR). The master receives data from the target but inverts the parity value received to simulate a parity error on the device's next master read data phase. In a first bus cycle, a PCI write command is performed to address 40h so that the command (010b) is written into the command register 301. In a second bus cycle, after the delay circuit 302 has enabled the decode gates 410–415, the strobe signal DATAXFER is asserted by the PCI interface circuitry 313. The signal DATAXFER (Data Transfer) is active following the PCLK clock that transferred data back to the master (i.e., IRDY and TRDY were active) and remains active for the next PCLK clock during which PAR is valid for the previously transferred data. As shown in FIG. 9C, signal DATAXFER is asserted after rising edge e+3 of PCLK. (The "M" indicates that the signal DATAXFER went high for a master reading rather than for a target writing.) This causes AND gate 414 (see FIGS. 8A–8B) of the command decoder and timing circuit 303 to assert signal MTDATAPARERR as shown in FIG. 9C. OR gate 422 then supplies a digital high to AND gates 423 and 424. If the select high/low bit 310 contains a digital zero, AND gate 423 is prevented from asserting signal PCIPARIERRH high. AND gate 424, on the other hand, is enabled to assert signal PCIPARIERR high. Again, the signal PCIPARIERRH is shown asserted in FIG. 9C to indicate when it would be asserted were the select high/low bit to contain a digital one.

When the data being read comes back from the target, the associated parity value sent by the target is received by the master on PCI PAR bus terminal PAR 322 and is inverted by exclusive OR gate 307 to simulate a parity error. The parity error check circuit 309 calculates the parity value for the data actually received and compares this with the inverted parity value. When the master's parity error check circuit 309 detects the mismatch, it asserts the signal PERR# low on PCI bus terminal PERR# 324 and asserts the signal DPRSET to log PERR# assertion in bit 8 of the status register. The parity error check circuit 309 also asserts the signal DPESET to log the error in bit 15 of the status configuration register of the master. The command is cleared by the DONE- signal as described above.

Figure 9D:
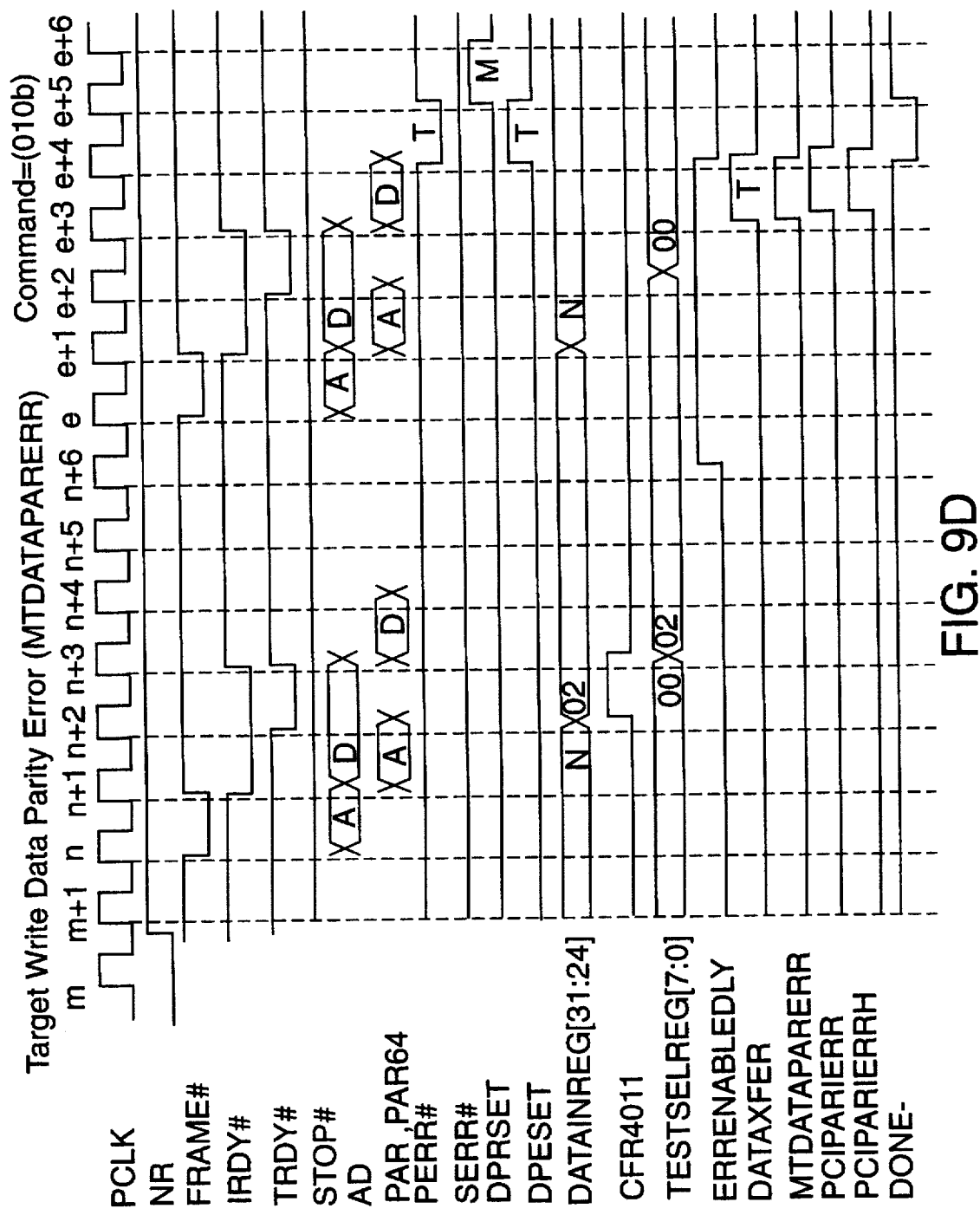

FIG. 9D illustrates execution of a command which simulates the "Target Write Data Parity Error" (MTDATAPARERR). A parity error is simulated on PCI bus line PAR or PAR64 during the device's next target write data phase that transferred data. Note that the same command (010b) is loaded into the command register as is loaded to simulate the master read data parity error. Whereas in the master read data parity error situation the strobe signal DATAXFER was generated when data was being transferred to the master during a read of the target, in the target write data parity error situation the strobe signal DATAXFER is generated when data is being received by a target. The signal PCIPARIERR being asserted after rising edge e+3 causes exclusive OR gate 307 to invert the parity value sent with the data by the target. The target's parity error check circuit 309 therefore detects the simulated parity error, asserts the signal PERR# on PCI terminal PERR# 324 and sets bit 15 in the device's (target) status configuration register by asserting the signal DPESET. The master of the transaction detects PERR# being asserted and asserts signal DPRSET internal to the master to set bit 8 of the master's status configuration register. The waveform labeled DPRSET in FIG. 9D therefore represents the signal internal to the master and not a signal internal to the target.

Figure 9E:
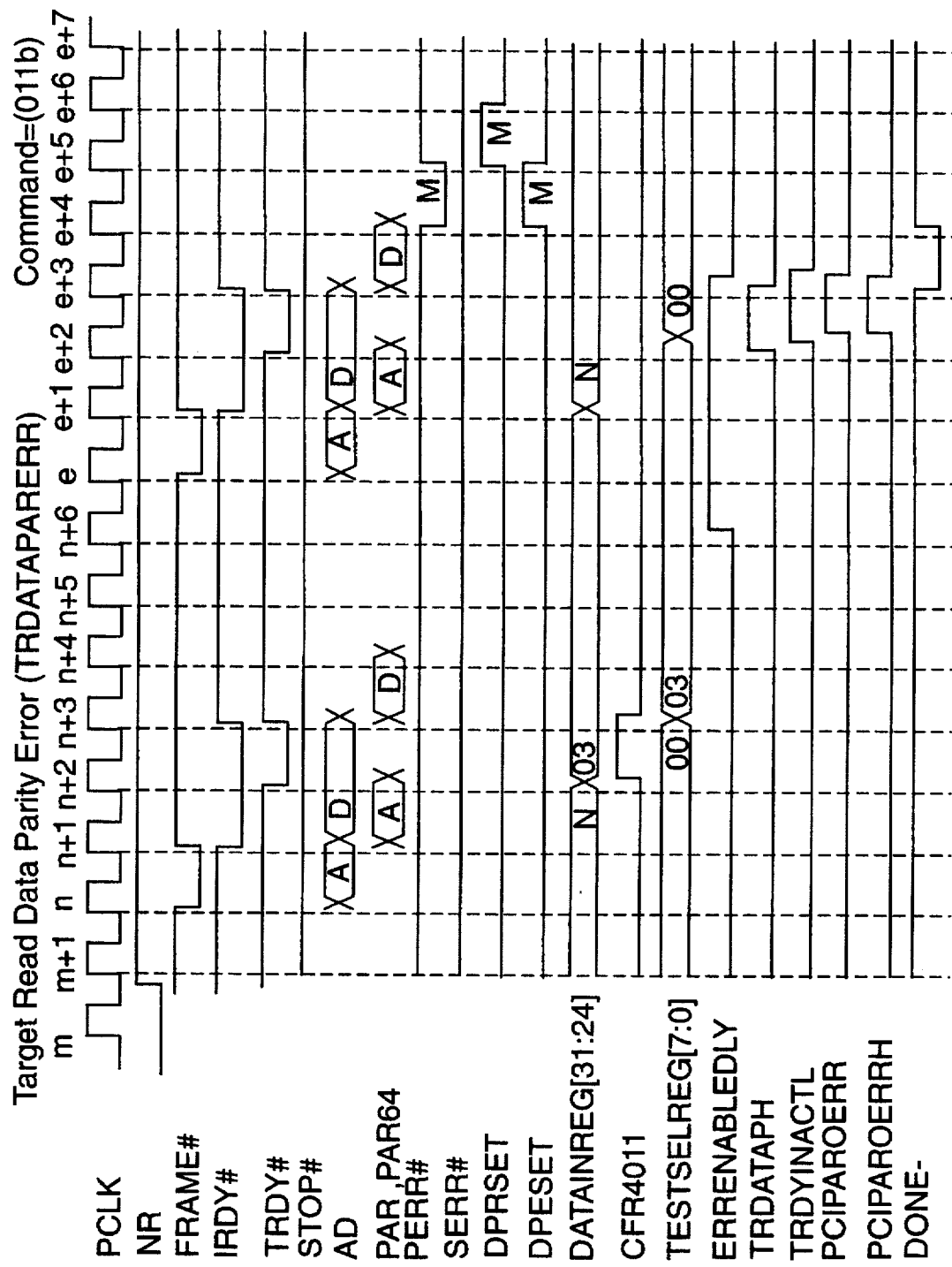

FIG. 9E illustrates execution of a command which generates the "Target Data Parity Error" (TRDATAPARRERR). A parity error is generated on the PAR PCI bus line during the device's next target read data phase that transfers data. The command register 301 of the target is loaded with the command (011b). The target therefore outputs data and an incorrect parity value. When TRDATAPH is asserted after ERRENABLEDLY is high, AND gate 413 outputs a digital high. OR gate 416 therefore supplies a digital high signal to AND gates 417 and 418. As described above, AND gate 418 asserts signal PCIPAROERR high after rising edge e+2 when select high/low bit 310 is not set. Exclusive OR gate 304 of the target therefore causes incorrect parity to be output onto the PCI bus through output register 306. The data and parity values continue to be supplied by the target onto PCI bus lines AD and PAR until the master indicates that the transaction can be completed. The PCI interface circuitry 313 of the target therefore generates the signal TRDYINACTL to indicate that the master has indicated that the transaction can be completed. When TRDINACTL is asserted, AND gate 421A supplies a digital high through OR gate 420 to flip-flop 419. Flip-flop 419 is therefore set on the rising edge e+3 PCLK and the command register is reset terminating the bus cycle.

When the master receives the data and inconsistent parity value from the PCI bus and detects the error condition, the master asserts the PCI signal PERR# and asserts signal DPESET of the master to set bit 15 of the master's status configuration register. Because the master of the transaction is to log PERR# assertions, the master also asserts signal DPRSET internal to the master to set bit 8 of the master's status configuration register. The waveforms labeled DPESET and DPRSET in FIG. 9E therefore represent signals internal to the master and not the target.

Figure 9F:
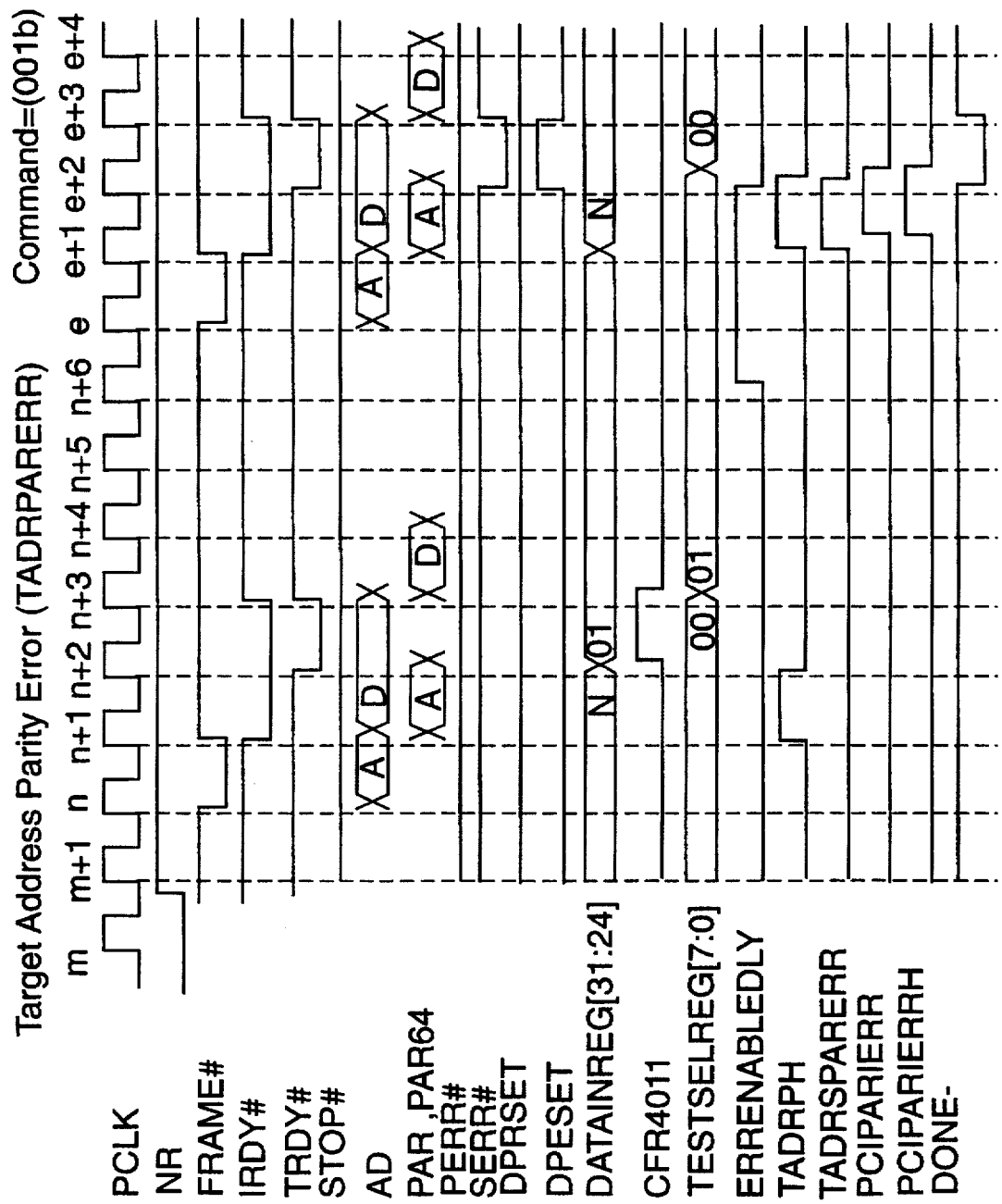

FIG. 9F illustrates execution of a command which simulates the "target address parity error" (TADRPARERR). A command (001b) is loaded into the command register 301 of a target during a first bus cycle and the delay circuit 302 keeps the decoding gates 410–415 disabled until after the first bus cycle is complete. When the device containing the bus error generation circuit 300 is being addressed as a target, the PCI interface circuitry asserts the strobe signal TADRPH ("target address phase") during the address phase. AND gate 415 of the command decoder and timing circuitry 303 therefore outputs a digital high which passes through OR gate 422. In the event the select high/low bit 310 is not set, AND gate 424 outputs signal PCIPARIERR high. The parity value for the address being sent to the target containing the bus error generation circuit 300 is therefore inverted by exclusive OR gate 307 of the target. When the parity error check circuit 309 of the target calculates the parity value for the address received and compares the calculated parity value with the inverted parity value from exclusive OR gate 307, the parity error check circuit 309 asserts the signal SERR# on PCI bus terminal SERR# 324 low to signal the error to the master and asserts the signal DPESET to set bit 15 of the status configuration register of the target. SERR# assertions are monitored by a central source on the PCI system board. The flip-flop 419 is set and the signal DONE- is asserted as previously described to clear the command from the command register and to reset the delay circuit.

Figure 9G:
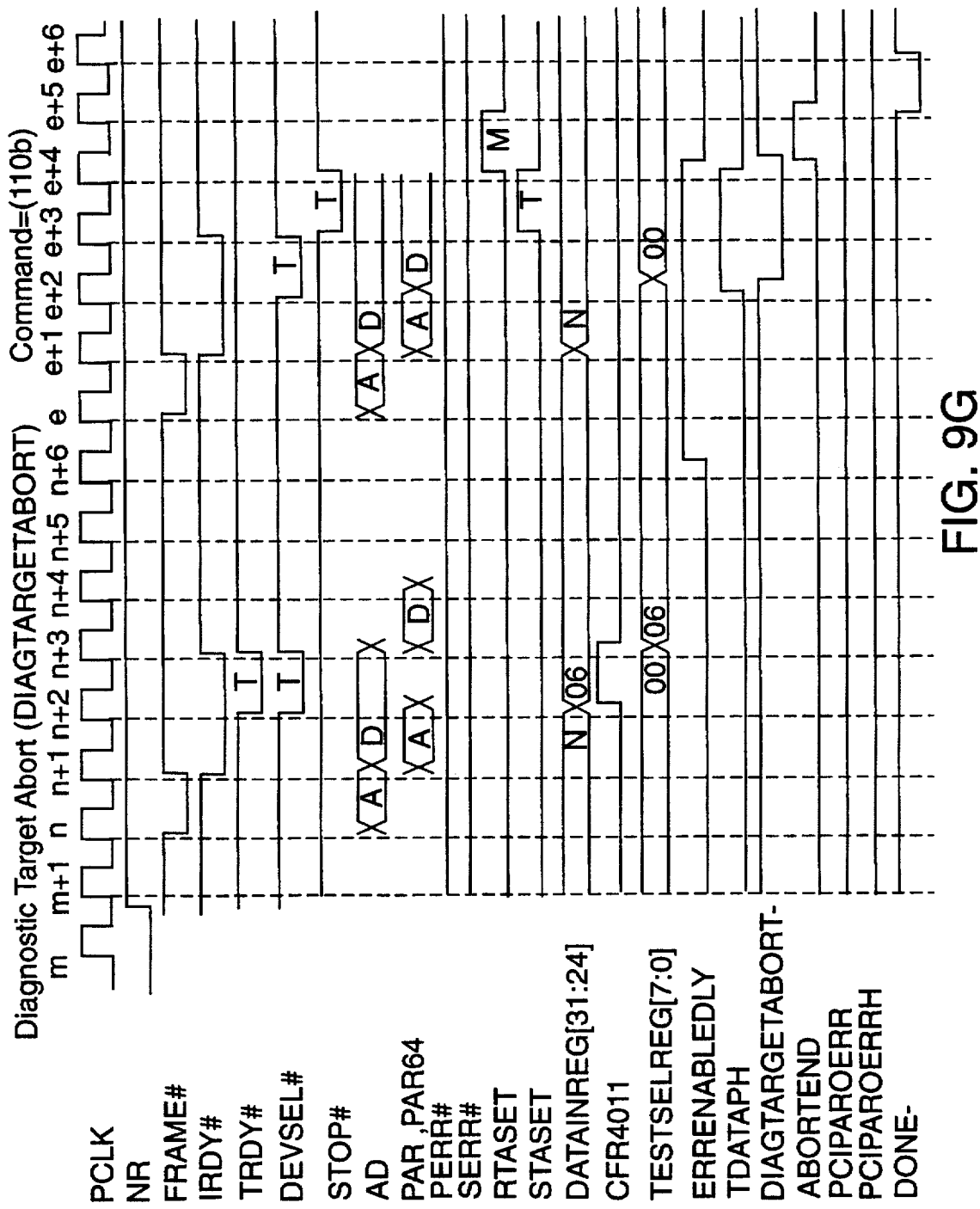

FIG. 9G illustrates execution of a command which generates a "Diagnostic Target Abort" sequence (DIAGTARGETABORT). In accordance with the PCI bus specification, a target which cannot respond to the transaction requested of it by a master must generate a specific target abort sequence thereby indicating to the master that: 1) the target could not respond and that the master should not attempt the transaction again, and/or 2) the data transferred may have been corrupted. For additional details on the target-abort sequence, see the PCI bus specification.

To generate the diagnostic target abort sequence using the bus error generation circuit 300, a command (110b) is loaded into the command register 301 of the target. As with the other commands, the delay circuit only enables the decode gates 410–415 after the command loading bus cycle has been completed. The PCI interface circuitry 313 pulses the signal TDATAPH (signal "target data phase" is one of the strobe signals) high during the data phase when the device is being accessed as a target during a read or a write. Accordingly, signal TDATAPH is shown pulsing high after the rising edge e+2 of PCLK in FIG. 9G. NAND gate 410 therefore asserts signal DIAGTARGETABORT- low. This causes the target containing the bus error generation circuit 300 to deassert PCI bus signal DEVSEL# of PCI bus terminal DEVSEL# (not shown) and to assert the PCI bus signal STOP# on PCI bus terminal STOP# (not shown) after rising edge e+3 as shown in the FIG. 9G. The target also asserts STASET ("send target abort set"), an internal signal of the target, to set bit 11 of the target status configuration register at rising edge e+3. Bit 11 being set indicates a target has performed a target about sequence. The master senses a target abort sequence when it senses the PCI signal DEVSEL# being asserted then being deasserted when TRDY# is not asserted, and STOP# being asserted when DEVSEL# is deasserted. In such a condition, the master asserts RTASET ("receive target abort set") at rising edge e+4 to set bit 12 of the master's status configuration register.

Although the sequence shown in FIG. 9G is a single data phase transfer, a target abort sequence is extended until the master terminates the cycle in a cycle having more one data phase clock cycle. A flip-flop 425 is therefore provided. When flip-flop 425 is 'set, a digital high is provided to flip-flop 419 to clear the command from the command register. Flip-flop 425 must therefore not be set until the target has completed the data phase as indicated by TDATAPH going low. As shown in FIG. 9G, when TDATAPH is deasserted after rising edge e+4, NAND gate 410 deasserts signal DIAGTARGETABORT- which is coupled to the clock input of flip-flop 425 thereby clocking flip-flop 425 and causing its output signal ABORTEND to be asserted high. ABORTEND is coupled through OR gate 420 to flip-flop 419. Flip-flop 419 is set at the next rising edge e+5 to clear the command register and the delay circuit as described above.

Figure 9H:
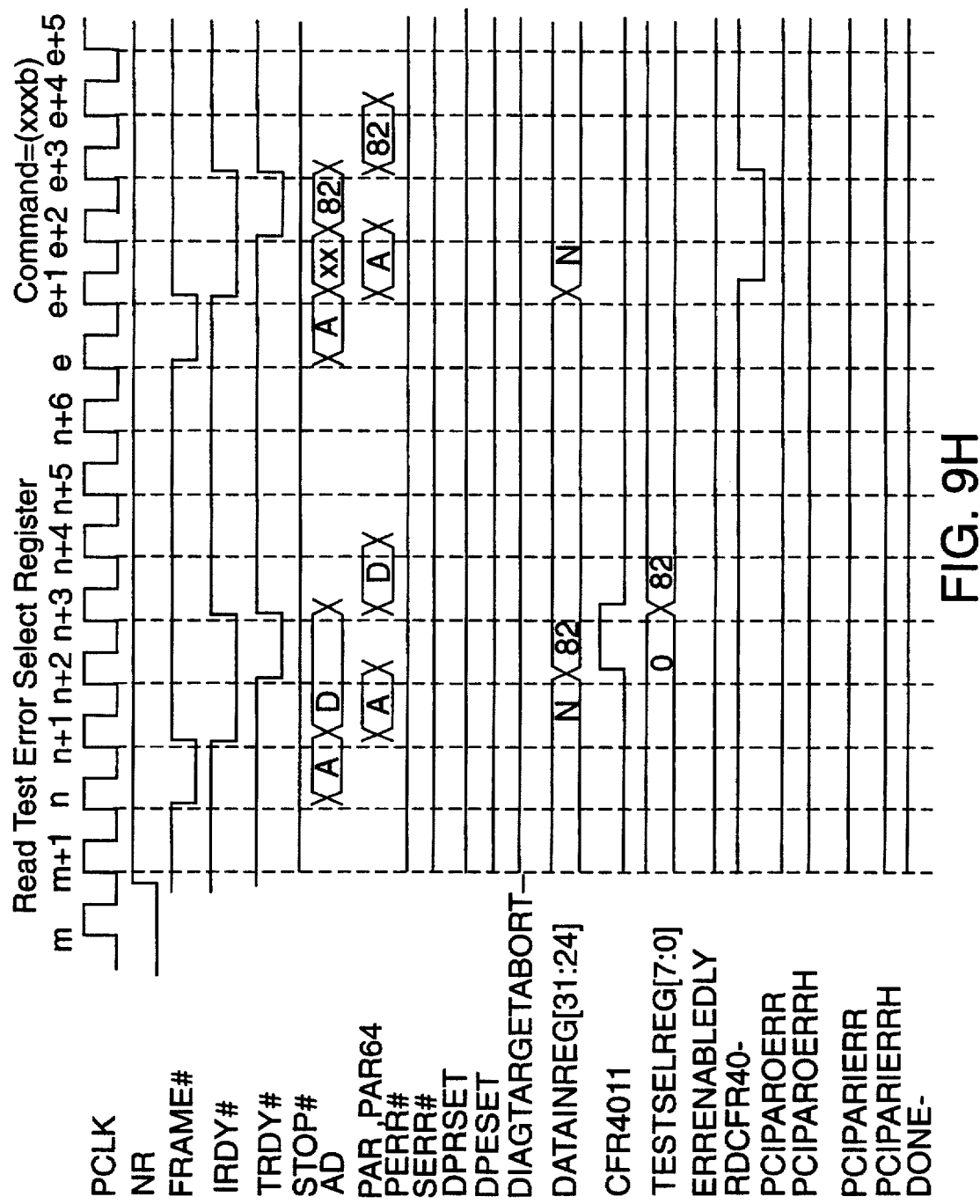

FIG. 9H illustrates the setting of the disable bit 311. When the disable bit is set, no error conditions are generated onto the PCI bus nor are any error conditions simulated. The command register and the select high/low bit can therefore be loaded with any desired values and read back to test the proper operation of the command register and select high/low bit. In FIG. 9H, the "8" of the value "82" of DATINREG indicates that PCI AD bit 31 was asserted and that bits 30, 29 and 28 were not asserted (see FIG. 7). In FIG. 9H, the "2" of the value "82" of DATAINREG selects MTDATAPARERR value for this example. However, any value other than "2" may be selected. Accordingly, the disable bit is set in the first bus cycle in which the value 82h is written into the PCIERRORGEN register at address 40h. The contents of the PCIERRORGEN can then be read in a subsequent read cycle without any error condition being generated or simulated.

As shown in FIGS. 8A–8B, setting flip-flop 404 causes a digital low to be supplied to AND gate 406 which in turn keeps the flip-flops 407–409 of the delay circuit asynchronously cleared. Accordingly, as shown in FIG. 9H, the signal ERRENABLEDLY does not transition high during the read cycle and the decode gates 410–415 are not enabled. The contents of the command register flip-flops 400–402, select high/low flip-flop 403 and disable flip-flop 404 are therefore read out and supplied onto the AD lines after rising edge e+2. Bus CFRD[31:24] in FIGS. 8A–8B is an internal bus which is coupled (the coupling is not shown in FIG. 6) to bus TDATA 325 (see FIG. 6). The data can be read out from the integrated circuit via multiplexer 326, ADOUT bus 327, output register 306 and AD/CBE PCI bus terminals 312. The signal RDCFR40- (see FIG. 9H) is an address decode signal generated by the PCI interface circuitry 313 which is asserted low during a read access from address 40h byte 3 (the PCIERRORGEN register).

The bus error generation circuit 300 can be used to test the proper functioning of the parity generator 318 of an integrated circuit on the PCI bus. A master having a bus error generation circuit can either test the proper functioning of its own parity generator or it can test the proper functioning of a target's parity generator.

A data value, for example, is written into a register 328 on the integrated circuit of the master. The master then executes an error command (MWDATAPARERR or MADRSPARERR) to output the data value in register 328 onto the PCI bus but to invert the parity value for that data as determined by parity generator 318. The parity value received on the PCI bus should then be the opposite of the parity value for the data in register 328 and the master makes sure the PERR# signal is asserted by the target. To ensure that the output of the parity generator 318 is not stuck at one digital value, a different data value is written into data register 328 which would have the opposite parity if parity generator 318 were working properly. An error command is executed to output the data value in register 328 onto the PCI bus but to invert the parity value for that data is then performed. The parity value received should then be incorrect but should be the opposite of the previously received incorrect parity value. Accordingly, the master monitors the PERR# signal to make sure it is asserted by the target. (The master determines that incorrect parity was properly detected by reading its own status configuration register bit 8 and/or by reading status configuration register bit 15 of the target.) If the master determines that an error was reported in both conditions, then it is known that the parity generator 318 has correctly determined and changed the parity value. A sequence of loading a data value in register 328, executing an error command, and making sure that a target reports the parity error on the PCI bus for all possible data values is then performed to exhaustively test the functioning of the parity generator 318 of the master.

A master can also test the proper functioning of the parity generator of a target by storing a data value in the target, reading the data value back from the target with correct parity, and then causing the target to execute a parity error command (TRDATAPARERR) and making sure that the parity value changed. A sequence of loading a data value in register 330 of the target, causing the target to execute the parity error command, and reading the data value back from the target to make sure that a parity error occurs on the PCI bus for each data value is then performed to exhaustively test the functioning of the parity generator 318 of the target.

Similarly, proper operation of a parity generator can be determined for address values output onto the PCI bus by causing the integrated circuit having the bus error generation circuit 300 to output addresses for which the parity values should change. Register 329 represents a source of an address of a master for an error condition bus cycle.

The proper operation of the parity generator in the parity error check circuit 309 of a master can also be determined. For example, the master stores a data value in a register in a target and then performs a read of that data value. The master then reads its own status configuration register bit 15 to make sure that there was no parity error. The master then performs a read of the data value using an error command and checks that bit 15 of the master's status configuration register is set. By exhaustively tested all data values using the error command and making sure that bit 15 is set in each instance, the proper functioning of the parity generator in the parity error check circuit 309 of the master is established.

Parity detection circuitry of a target which does not have a bus error generation circuit can also be tested. Data is written to the target and the master reads its own status register bit 8 (or the target's bit 15) to make sure that no parity error occurred. The master then writes data to the target using the error command MWDATAPARERR and reads its own status register bit 8 (or the target's bit 15) to make sure that an error condition was detected and logged. After writing all possible data values using the error command and making sure that an error condition is always detected and logged, it is determined that the target's parity detecting circuitry is functioning properly. In a similar fashion, a target having a bus error generation circuit can test the parity detection circuitry of a master which does not have a bus error generation circuit.

In a similar fashion, all above described error commands may be repeated with bit 310 containing a digital one for testing proper operation of the high half of the PCI 64-bit bus (AD[63:62], CBE[7:4] and PAR64).

Appendix A is a hierarchical circuit schematic of a part of an integrated circuit in accordance with one embodiment of the present invention. The sheet labeled TARGET.2 is a circuit schematic of a circuit for generating the target abort sequence. The lead labeled DIAGTARGETABORT- on FIGS. 8A-8B couples to the lead labeled DIAGTARGETABORT- on the sheet labeled TARGET.2. The leads labeled DEVSELO- and STOPO- on the sheet labeled TARGET.2 are coupled to tri-state output drivers and associated PCI bus terminals. The sheets labeled PATH_IN.1 and PATH_IN.4 are circuit schematics of a specific embodiment of circuitry which corresponds with the parity error check circuit 309 of FIG. 6. The sheet labeled PATH_OUT.3 is a circuit schematic of a specific embodiment of circuitry which corresponds with parity generator 318 and exclusive OR gate 304 of FIG. 6. The sheets labeled PATH_OUT.1 and PATH_OUT.2 are circuit schematics of a specific embodiment of circuitry which corresponds with output register 306 of FIG. 6.

Appendix B contains five sheets illustrating another specific embodiment. The symbol PCIERRORGEN64 of Appendix B replaces the symbol PCIERRORGEN on sheet SLAVE.1 of Appendix A. The sheet PCIERRORGEN64 of Appendix B replaces the sheet PCIERRORGEN of Appendix A. The sheet TARGET.2A of Appendix B replaces the sheet TARGET.2 of Appendix A. The sheet PATH_IN.4A of Appendix B replaces the sheet PATH_IN.4 of Appendix A. After this replacement, the combined schematics describe another specific embodiment of part of an integrated circuit.

Although certain exemplary specific embodiments have been described in order to illustrate the invention, the invention is not limited to the specific embodiments. Error conditions can be generated onto a bus by changing the data and not changing the associated parity value. Error conditions can be generated onto a bus by changing the address and not changing the associated parity value. A bus error generation circuit can be incorporated into any type of integrated circuit which interfaces to a parallel bus including microprocessors and peripheral integrated circuit chips. In some embodiments, the bus error generation circuit does not have a command register of flip-flops which stores a command. Error conditions may be generated and/or simulated on busses other than a PCI bus. Means other than exclusive OR gates can be used to supply incorrect parity onto the bus and/or to simulate incorrect parity being present on the bus. Any suitable output circuitry and bus interface circuitry can be used. Accordingly, various modifications, adaptations and combinations of selected features of the specific embodiments are within the scope of the present invention as set forth in the appended claims.

What is claimed is:

1. A method, comprising the steps of:
   (a) controlling an integrated circuit of a first device to generate a bus error condition onto a parallel bus;
   (b) on a second device coupled to said parallel bus, detecting said bus error condition and asserting a signal on said bus indicative of said bus error condition;
   (c) receiving said signal on said integrated circuit and setting a bit in a status register of said integrated circuit to log said bus error condition; and
   (d) repeating said steps (a) through (c), wherein each of said steps (a) involves outputting a different data value onto said parallel bus and outputting an incorrect parity value onto said parallel bus for the different data value, the incorrect parity value during the first step (a) being different from the incorrect parity value output during the second step (a).

2. An integrated circuit, comprising:
   a first plurality of address and data terminals for coupling to address and data lines of a PCI bus;
   a parity generator having a plurality of input leads coupled to the first plurality of address and data terminals;

a second terminal for coupling to a PAR line of the PCI bus;

a third terminal for coupling to a PERR# line of the PCI bus;

a bus error generation circuit having a first input lead coupled to an output lead of the parity generator, the bus error generation circuit having a first output lead and a second input lead coupled the second terminal, the bus error generation circuit having a third input lead coupled to the third terminal, the bus error generation circuit also having a second plurality of output leads coupled to the plurality of input leads of the parity generator and to the first plurality of address and data terminals, the bus error generation circuit being capable of inverting a parity value received from the parity generator and outputting an inverted parity value on the second terminal; and a register having a plurality of output leads, the plurality of output leads being coupled to a second plurality of input leads of the bus error generation circuit so that information stored in the register can pass through the bus error generation circuit and to the first plurality of address and data terminals, wherein the bus error generation circuit comprises:

means for inverting a value received on the second terminal; and a parity error check circuit outputting an error signal onto the third terminal if a parity determined for information received on the first plurality of address and data terminals differs from a value received from the means for inverting.

3. The integrated circuit of claim 2, wherein the bus error generation circuit further comprises:

a command register; and a command decoder, wherein the means for inverting has a first input lead, a second input lead, and an output lead, the first input lead being coupled to the second terminal, the second input lead being coupled to an output lead of the command decoder, the output lead being coupled to an input lead of the parity error check circuit.

4. The integrated circuit of claim 3, wherein the bus error generation circuit further comprises:

means for inverting a parity value received from the parity generator, the means for inverting a parity value having a first input lead, a second input lead and an output lead, the first input lead being coupled to the output lead of the parity generator, the second input lead being coupled to an output lead of the command decoder; and an output register having an input lead and an output lead, the input lead being coupled to an output lead of the means for inverting a parity value, the output lead being coupled to the second terminal.

* * * * *